United States Patent

Suggs et al.

Patent Number: 5,804,316
Date of Patent: Sep. 8, 1998

[54] BAKED PACKING FOR SEALING SHAFTS AND VALVE STEMS

[75] Inventors: Steven M. Suggs, Atlanta, Ga.; John Hawkins, Hanahan, S.C.; Reid M. Meyer, Atlanta, Ga.

[73] Assignee: RM Engineered Products, Inc., N. Charleston, S.C.

[21] Appl. No.: 632,764

[22] Filed: Apr. 15, 1996

Related U.S. Application Data

[63] Continuation of Ser. No. 123,527, Sep. 17, 1993, abandoned.

[51] Int. Cl.⁶ ........................................ B32B 9/00
[52] U.S. Cl. ........................ 428/408; 428/377; 428/396; 428/408; 428/458; 277/229; 277/230; 277/235 R; 277/DIG. 6
[58] Field of Search ................ 428/376, 377, 428/379, 396, 408, 458, 688; 277/226, 229, 230, 235 R, DIG. 6

[56] References Cited

U.S. PATENT DOCUMENTS

| | | | |
|---|---|---|---|
| 1,020,115 | 3/1912 | Price | 277/230 |
| 1,501,541 | 7/1924 | Hall | 428/377 |
| 2,666,005 | 1/1954 | Norehad | 154/53.6 |
| 3,120,960 | 2/1964 | Pipert | 277/230 |
| 3,404,061 | 10/1968 | Shane et al. | 161/125 |
| 3,481,824 | 12/1969 | Poltorak | 277/230 |
| 3,646,846 | 3/1972 | Houghton | 277/230 |
| 3,791,658 | 2/1974 | Zumeta | 277/230 |
| 3,894,742 | 7/1975 | Trelease | 277/203 |
| 4,086,067 | 4/1978 | Busch et al. | 51/296 |
| 4,214,761 | 7/1980 | Pippert | 277/230 |
| 4,443,517 | 4/1984 | Shah | 428/283 |
| 4,455,334 | 6/1984 | Ogino | 277/230 |
| 4,667,969 | 5/1987 | Suggo, III | 277/230 |
| 4,961,988 | 10/1990 | Zhu | 428/408 |
| 5,225,262 | 7/1993 | Leduc | 428/408 |
| 5,227,365 | 7/1993 | Van der Sype | 428/408 |

FOREIGN PATENT DOCUMENTS

| | | |
|---|---|---|
| 50-39217 | 12/1975 | Japan . |
| 55-69360 | 5/1980 | Japan . |
| 454649 | 7/1935 | United Kingdom . |
| 2243883 | 11/1991 | United Kingdom . |

*Primary Examiner*—Timothy Speer
*Attorney, Agent, or Firm*—Kennedy, Davis & Kennedy

[57] ABSTRACT

A packing having a flexible core and a skin of expanded intercalated graphite with an adhesive layer, baked for a predetermined period at a predetermined temperature for reduced adhesive flowability while maintaining tack for holding the skin wrapped around the core of the packing and a method of manufacturing such packing.

8 Claims, 3 Drawing Sheets

BAKED PACKING FOR SEALING SHAFTS AND VALVE STEMS

This application is a continuation of application Ser. No. 08/123,527 filed on Sep. 17, 1993 now abandoned.

TECHNICAL FIELD

The present invention relates to packing material for sealing rotary or reciprocating shafts and valve stems. More particularly, the present invention relates to a packing material having reduced adhesive-induced packing damage and freeze of rotary or reciprocating shafts and valve stems operating in a stuffing box and a method of manufacture of such improved packing material.

BACKGROUND OF THE INVENTION

Fluid flow control equipment, such as pumps, compressors, agitators, and valves are widely used in industries such as utilities, refineries, chemical and petrochemical. These equipment generally serve a fluid flow control function, and each typically includes a rotary or reciprocating shaft. The shaft can be motor driven or manually operated. The motor is selected to have power sufficient to turn the shaft against the expected force acting in the fluid flow device. The shaft rotates in order to control fluid flow through the device. For example, the shaft of a rotary pump operatively connects to a motor on the exterior of a pump casing to an impeller or blade on the interior. The motor rotates the shaft, which in turn rotates the impeller. In a valve, the shaft connects to a gate on the interior of the casing for controlling flow of fluid through the valve. Thus, there are at least three openings in the pump (or valve) casing: a first fluid opening for an inlet pipe, a second fluid opening for an outlet pipe, and an opening for the shaft.

The two fluid openings for the inlet and outlet pipes are sealed conventionally. The opening for the shaft however is sealed with a material known as packing. The shaft passes through a recessed area within the pump (or valve) known as the "stuffing box". The term stuffing box is derived from the method employed to prevent fluid from leaking through this opening in the casing for the shaft. The fluid is contained within the pump by stuffing or packing a material around the shaft to seal the opening. The packing material in the stuffing box thus functions to protect the fluid flow equipment against leakage where the rotating or reciprocating shaft or valve stem extends through the casing.

One known packing provides a resilient flexible core of longitudinally braided yarns having an exterior graphite skin. This skin is formed from a sheet of expanded intercalated graphite having a mylar adhesive surface. The sheet is cut into narrow tapes that are spirally wound about the core. The wrapping is made so that the edges of the tape overlap. This packing is typically supplied as a pre-formed ring having an inner diameter and an outer diameter sized to fit a particular stuffing box. For example, a five-inch valve made by one manufacturer may have a two-inch stem in a three inch diameter stuffing box. A five-inch valve made by another manufacturer may have a three inch stem in a four inch stuffing box. Each requires a one half inch cross-sectional packing, but the ring diameters are different. The packing ring for the first example valve has an outer diameter of three inches and an inner diameter of two inches. The second example valve requires a packing ring with a four inch outer diameter and a three inch inner diameter.

Another known packing provides a flexible core wrapped longitudinally with a graphite skin of expanded intercalated graphite having a mylar adhesive surface. The core is metal mesh or braided synthetic yarn. The packing with the metal mesh is manufactured by dipping a length of the mesh into a slurry of graphite powder, binder and solvent. The mixture dries resulting in a flexible core possessing beneficial maintenance features of the wire mesh core and the non-reactivity qualities and resiliency of graphite. A wire core generally is easier to engage and extract from a stuffing box during maintenance than is a fiber core. The skin material is then longitudinally wrapped about the core. The skin material is made of expanded intercalated graphite having a layer of mylar adhesive. The resulting sealing material is passed through a coiling device that densifies the packing to the desired degree as well as spiralling the packing into a coil for bulk handling.

While these packings have met a need in the industry and successfully sealed valves under extreme conditions, drawbacks particularly limit their use in fluid flow devices that operate with fluids at lower temperatures. In particular, the mylar adhesive in the skin material flows from the packing during repacking of the stuffing box. Repacking involves removal of old packing and installation of new packing. The rings of packing are inserted in the stuffing box around the shaft. A gland follower covers the open end of the stuffing box. A flange extends outwardly from the gland follower against the stack of packing rings. The gland follower is torqued down into the stuffing box by nuts threaded onto bolts extending from the fluid flow device. The gland follower compresses the packing in the stuffing box to effect a seal.

However, the extreme force of the gland follower against the packing also causes the adhesive to weep or migrate from the packing. Such migration of the adhesive occurs primarily during installation of the packing. The adhesive migrates between the packing and the shaft. Adhesive exuded from the packing under pressure causes the shaft to freeze by adhering the shaft to the packing and the stuffing box. As the adhesive sets, it can rigidly connect the shaft to the packing and to the inner wall of the stuffing box. Additional force is then needed to break the adhesive bond and release the shaft. This is normally not a significant problem for manually operated fluid flow devices. For a motor-operated fluid flow device however, a frozen or locked shaft is a significant problem. The motor may be unable to overcome the adhesive bond and rotate the shaft upon demand. A valve or other device that should open (or close) does not. This risks damage to equipment, processes, and personnel.

The exuded adhesive can cause problems other than adhering the shaft to the packing. Particularly, migration of adhesive damages the packing, which leads to a shortened useful life for the packing. Damaged packing has leak paths through which the fluid to be sealed passes under pressure. A clump of adhesive on the shaft causes the travel of the shaft to be sluggish through the packing. The clump can damage packing by forming channels through which the fluid to be sealed can pass.

Accordingly, there is a need in the art for an improved packing material having reduced adhesive flowability while maintaining adhesive tack, and a method of manufacturing such packing.

SUMMARY OF THE INVENTION

The packing material made in accordance with the present invention reduces adhesive-induced lockup of rotary or reciprocating shafts operating in a sealed stuffing box of a fluid flow device. Briefly described, the method of forming the packing material for sealing a rotary or reciprocating shaft in a stuffing box of a fluid flow device comprises baking the packing material at a predetermined temperature for a predetermined period sufficiently to reduce the flowability of the adhesive in the packing material while maintaining adhesive tack to hold the packing together.

More particularly described, the method comprises applying an adhesive film to a sheet of expanded intercalated graphite to form a skin material. The skin material then is wrapped around a flexible core to form a jacketed length of packing. The jacketed packing is baked for a predetermined period at a predetermined temperature to cure the adhesive sufficiently to reduce flowability while maintaining tack.

In another aspect of the present invention, the jacketed packing is placed in an oven before heating to the predetermined temperature. The oven is heated to a temperature in a range of about 350° F. to about 450° F. In a preferred embodiment, the packing is baked at 400° F. for two hours. In an alternate embodiment, the packing is then coated with a lubricating material.

In one aspect of the present invention, the skin material can be applied as a winding of tape on the outer surface of the core with the edges of the tape arranged in overlapping relationship to provide a continuous jacket on the core. In another aspect, the skin material can be applied as an elongated sheet longitudinally wrapped around the core to provide a single-seam continuous jacket.

The packing material of the present invention seals a rotary or reciprocating shaft in a stuffing box of a fluid flow device. The packing material comprises a flexible core wrapped with a skin and baked for a predetermined period at a predetermined temperature sufficient to cure the adhesive in the skin to have reduced flowability yet maintain tack to hold the packing material together.

More particularly described, the packing material comprises a flexible core wrapped with a skin of expanded intercalated graphite having a layer of adhesive. The flexible core of the packing can be made of metal mesh or synthetic fibers braided together. The flexible core can be first immersed in a slurry of a lubricant and a binder before being wrapped. The skin material envelopes about the core to form a jacketed packing. The jacket packing is then heat cured for a predetermined period in a predetermined temperature sufficient to reduce the flowability of the adhesive while maintaining its tack. In an alternate embodiment, a lubricant is applied to the exterior surface of the skin after baking, for facilitating installation of the packing in a fluid flow device.

In one aspect of the present invention, the skin material is formed as a tape for wrapping spirally around the core. The edges of the tape are arranged in overlapping relationship to provide a continuous jacket on the core. In another aspect, the skin material is an elongated sheet that is wrapped longitudinally around the core to provide a single-seam continuous jacket.

Accordingly, it is an object of the present invention to improve packing materials for sealing a rotary or reciprocating shaft or valve stem.

It is another object of the present invention to reduce the flowability of adhesives used in packing materials for sealing a stuffing box.

It is another object of the present invention to maintain sufficient adhesive tack in packing materials while reducing adhesive flowability, for stuffing box service.

It is another object of the present invention to reduce adhesive lockup of rotary or reciprocating shaft operating in a stuffing box.

These and other objects, features, and advantages of the present invention will become apparent from a reading of the following specification, in conjunction with the drawings and appended claims.

DETAILED DESCRIPTION

Figure 1:
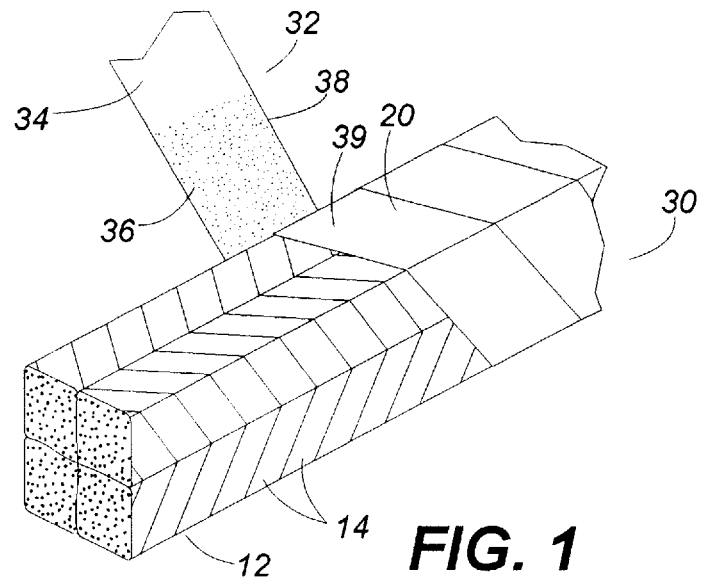
FIG. 1 is a perspective view of a preferred embodiment of a packing material of the present invention.

Referring now in more detail to the drawings, in which like numerals indicate like parts throughout the several views, FIG. 1 shows a perspective view of a preferred packing 10 made by the method of the present invention as discussed below. It is to be understood that the packing made by the method of the present invention comprises a seal and is referred to herein as either a seal or a packing material. The packing 10 comprises an elongate flexible core 12 made of a plurality of interwoven yarns 14. Each of the yarns 14 comprises a plurality of braided fibers 16. In an embodiment having a wire mesh core 12, a binder material preferably is received within the interstices of the wire mesh. The binder material preferably comprises solidified graphite. The binder material is introduced into the flexible core 12 by dipping the mesh core in a mixture of graphite powder, binder, and a solvent. Other binders or powders can be used to fill the interstices of the braided core 12. Cores made of synthetic yarns typically do not require a binder material. The flexible core can be manufactured of a number of materials, including fabric and synthetic yarns, rubber, PVC, paper and wire. The flexible core in alternate embodiments can be a hose, sleeve, pipe, and the like. It is preferred that the core 12 be flexible and resilient for use as a seal. A preferred embodiment uses fiberglass or carbon fibers to form the core 12.

A skin element 20 encloses the flexible core 12. The skin element 20 comprises a sheet 22 of expanded intercalated graphite having an adhesive layer 24. The sheet 22 has a leading end 26 and a trailing end 28. In a preferred embodiment, the adhesive is mylar, such as 255M supplied by Adchem of Westbury, N.Y. The mylar adhesive 24 provides the sheet 22 with a backing so that the sheet can flex and bend without breaking or tearing. The skin element 20 wraps longitudinally around the flexible core 12. The adhesive layer 24 bonds the sheet 22 to the outer surface of the core 12. The skin 20 preferably has a thickness of between about 1 and 10 mil. In a preferred embodiment of the packing material 10, the skin 20 is wrapped around the core 12 sufficiently to have a thickness of about 5 mil.

Figure 2:
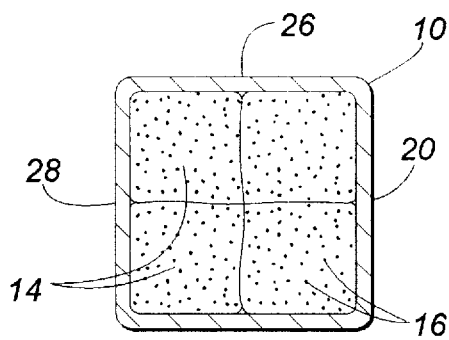
FIG. 2 is an end view of the packing material shown in FIG. 1.

FIG. 2 illustrates a cross-sectional view of the packing 10 shown in FIG. 1. The leading end 26 attaches to the side of the core 12 and the sheet 20 wraps around the core with the tailing end 28 overlapping a portion of the sheet. The packing 10 comprises the braided core 12 with the skin 20 forming a barrier around the core that restricts fluid flow through the packing.

Figure 3:
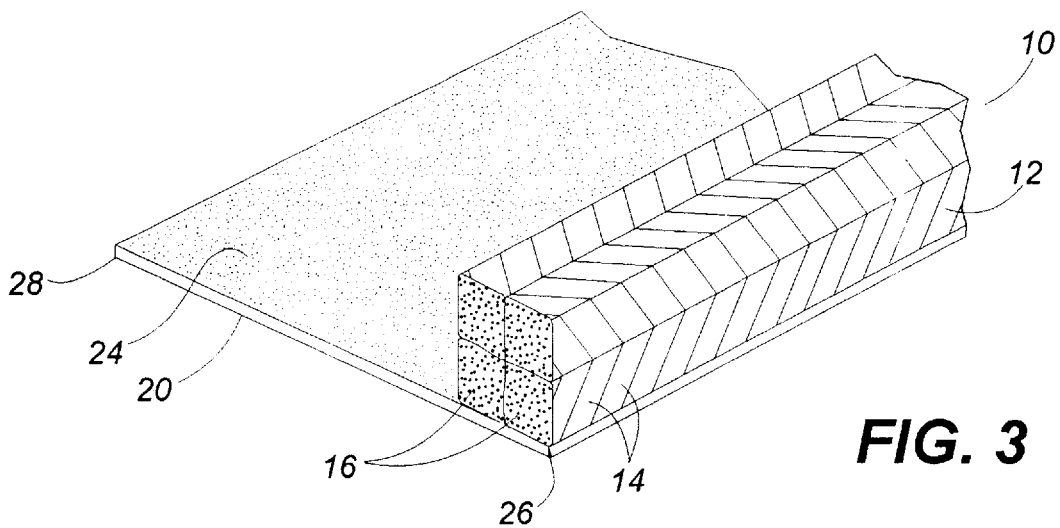
FIG. 3 is a perspective view of an alternate embodiment of the packing material of the present invention.

FIG. 3 illustrates in perspective view an alternate embodiment 30 of the packing 10 shown in FIG. 1. As discussed above, the flexible core 12 is made of the plurality of interwoven yarns 14. The skin 20 however comprises a plurality of wrappings of a narrow graphite ribbon 32. The ribbon 32 comprises a narrow sheet of expanded intercalated graphite 34 with a layer of adhesive 36. In a preferred embodiment, the adhesive 36 is mylar. The narrow ribbon 32 preferably is cut from an enlarged sheet, such as the sheet 22 shown in FIG. 1 for wrapping the core 12. The adhesive layer 36 attaches the ribbon 32 to the outer surface of the core 12. Preferably, the ribbon 32 spirally wraps around the core 12 in an overlapping manner. The wrapping of the ribbon 32 thereby is arranged so that an edge 38 of the ribbon overlaps an edge portion 39 of the ribbon attached to the core 12.

Figure 4:
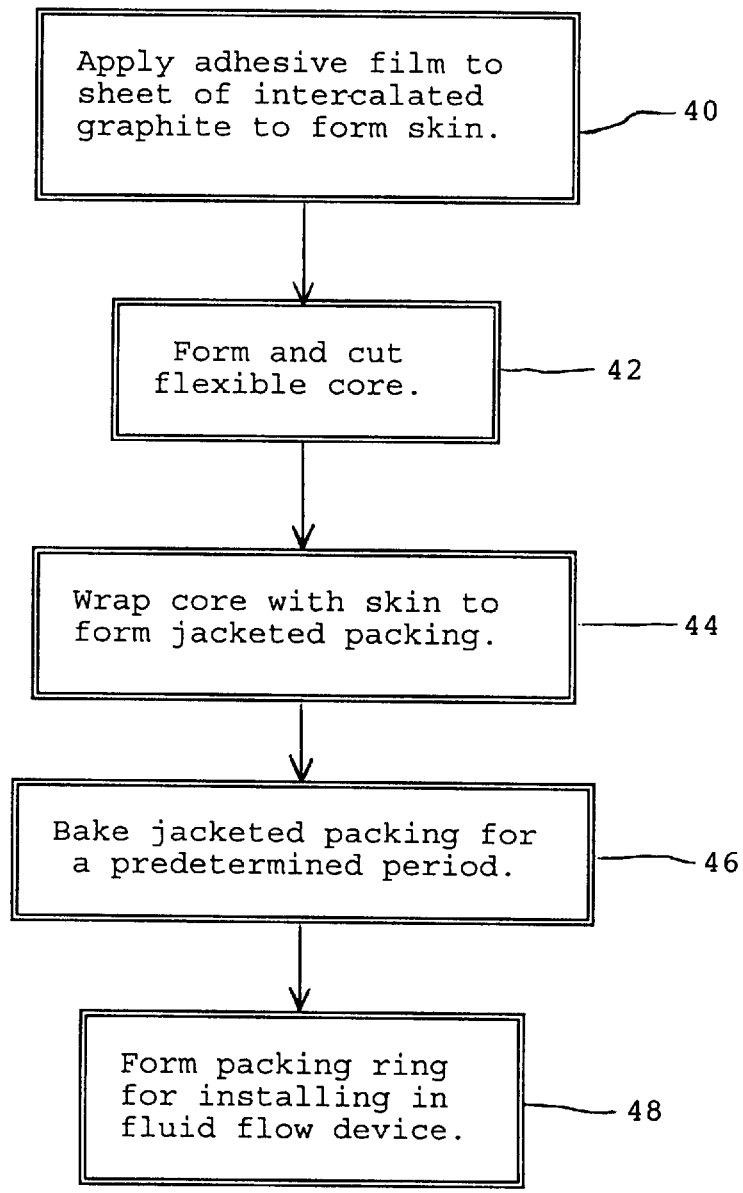
FIG. 4 is a schematic illustration of the method of making the packing illustrated in FIGS. 1 and 3.

The packings 10 and 30 are made according to the method schematically illustrated in FIG. 4. The skin material 20 is formed by applying 40 the mylar adhesive film to one surface of the sheet 22 of expanded intercalated graphite. The sheet 22 comprises a plurality of flakes of expanded intercalated graphite. These flakes are formed by treating natural or synthetic flake graphite with an intercalating agent such as fuming nitric acid, fuming sulfuric acid, or mixtures of concentrated nitric and sulfuric acid. Expandable intercalated flake graphite can then be expanded to form a low density, worm-like form of particulate graphite. The production of expandable intercalated flake graphite as an intermediate step in the production of expanded intercalated flake graphite is described in U.S. Pat. No. 3,404,061. The sheet 22 is formed from a thick layer of the expanded flakes pressed together such as by a roller or a calendaring process.

The flexible core 12 is then formed and cut 42 to length. The flexible core 12 is of conventional construction, such as yarns braided in a braiding machine. An alternate embodiment uses a wire mesh core filled with a graphite material. A solution of graphite powder, binder and solvent is formed. The core is dipped in the solution to fill the interstices of the mesh. The filled core is removed and dried.

The flexible core 12 is then wrapped 44 with the skin 20. In one embodiment illustrated in FIG. 1, the skin 20 is the elongated sheet 22 that is wrapped longitudinally around the core 12. The core 12 is placed on the sheet 22 on the leading edge 26 and wrapped towards the trailing edge 28. In an alternate embodiment (not illustrated), the skin 20 comprises two sheets 22 bonded together with the adhesive 24. One of the sheets has a width greater than the other. This leaves an edge portion at the trailing end 28 with an adhesive-exposed surface. The skin 20 in that embodiment is secured around the core 12 by the exposed portion of adhesive overlapping the wrapped sheet, but no adhesive contacts the exterior of the core.

In the embodiment illustrated in FIG. 2, the skin 20 comprises the narrow ribbon 32. The ribbon 32 wraps at an angle around the core 12 in an overlapping manner to form a continuous skin 20. The edge 38 overlaps the edge portion 39 as the ribbon 32 is spirally wrapped on the core 12.

The core 12 wrapped with the skin 20 forms a jacketed packing that is then baked 46 for a predetermined period at a predetermined temperature. The oven for baking the packing 10 is heated to between about 350° F. to about 450° F. The packing 10 is baked for between about one and three hours. In a preferred embodiment, the packing is baked at 400° F. for two hours. In a preferred embodiment, the jacketed packing is placed in the oven prior to starting to heat the oven. The jacketed packing bakes to cure the adhesive sufficiently to reduce flowability of the adhesive while maintain the tack so that the skin 20 does not unwrap. After cooling, the packing 10 and 30 is prepared for shipment to a facility for installation as packing in a fluid flow device. The packing 10 illustrated in FIG. 1 preferably is formed into a spiral coil to facilitate handling. The packing is spiraled by turning the packing in an auger screw against a roller. In an alternate embodiment, the packing is spiralled before and after baking.

In an alternate embodiment, the baked packing is then coated with a lubricant for facilitating installation of the packing in a fluid flow device. The coating of lubricant is preferably applied by immersing the packing in a solution of tetrafluoroethylene (TFE) or TFE and graphite. The solution by volume is about 1 to 3 to about 1 to 5 TFE to water. Another lubricant is C5A made by Fel-Pro of Skokie, Ill. The C5A material is a high temperature, anti-seizing lubricant.

Figure 5:
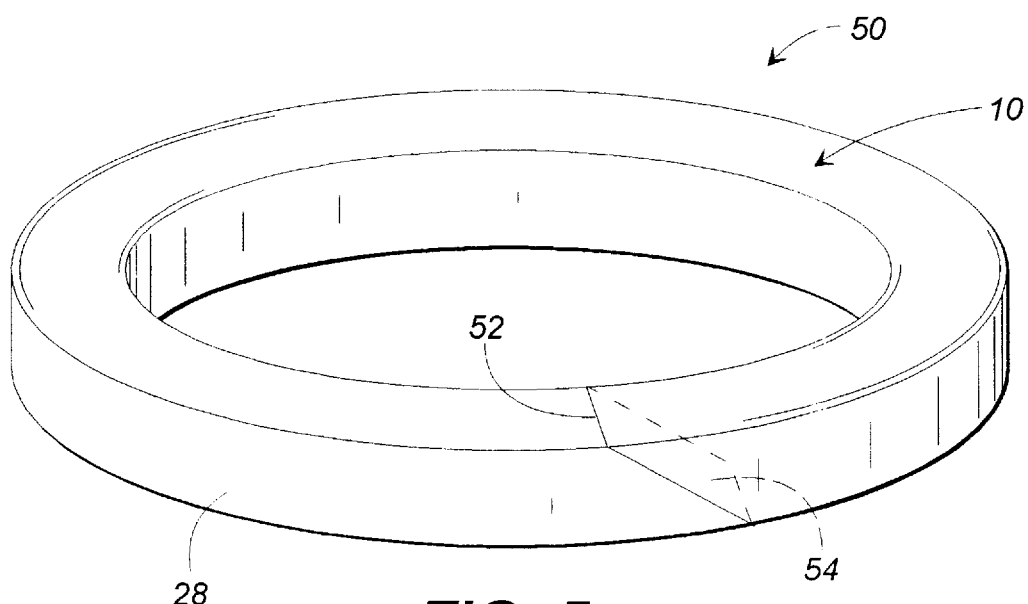
FIG. 5 is a packing ring made from the packing material illustrated in FIG. 1.

FIG. 5 illustrates a ring-like seal 30 formed by cutting a selected length of the packing 10. A similar ring is formed by cutting the packing 30 to length. The cut length of packing 10 is then encircled to form a packing ring 50 with the trailing edge 28 overlap on the exterior surface of the ring. It is preferred that a cut line 52 extend diagonally across one pair of opposed faces 54 (shown in hidden line) of the assembled packing 10 to obtain the mating engagement of the ends of the ring seal 50. The ring seal 50 can then be sized or otherwise conformed in a compression die to obtain the desired shape and configuration for sealing the stuffing box of pumps, valves, and the like having rotary or reciprocating shafts.

Figure 6:
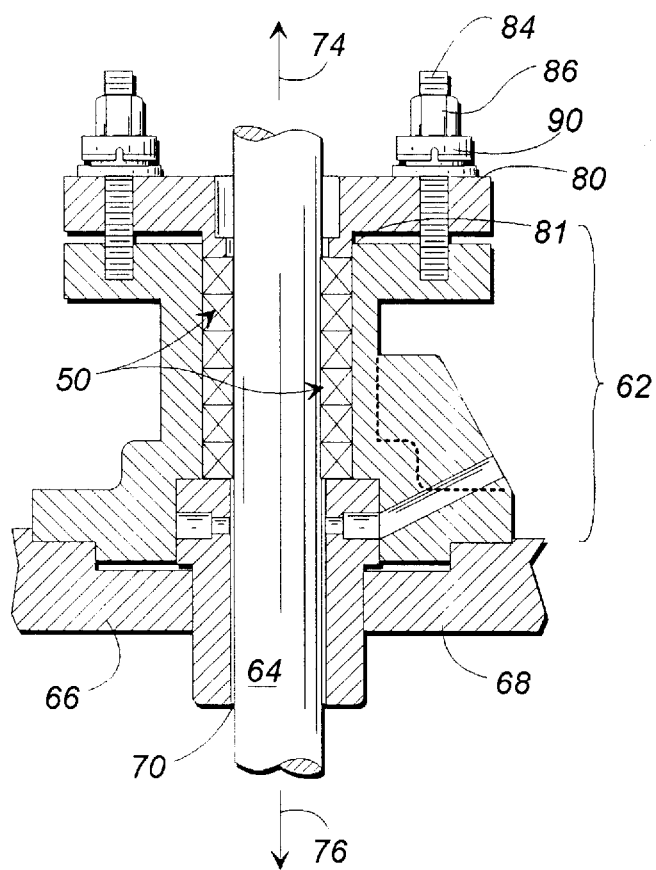
FIG. 6 is a cross-sectional view of a pump, including a stuffing box, illustrating the use of the packing ring illustrated in FIG. 5.

FIG. 6 is a cross-sectional illustration of a pump 60 having a plurality of seals 50 constructed in accordance with the present invention. The pump 60 provides a stuffing box generally designated 62 through which a shaft 64 extends. The pump 60 defines three openings 66, 68 and 70. The openings 66 and 68 are fluid flow ports provided for the intake and expulsion of fluid, respectively. The opening 66 identifies the location at which fluid enters the pump 60 and the opening 68 identifies the location at which fluid is expelled from the pump. The opening 70 is provided for a shaft 64. The shaft 64 connects to a motor (not shown) at one end and to an impeller (not shown) at the other end. The motor end of the shaft 64 is indicated by the arrow 74. The impeller end of the shaft 64 is indicated by the arrow identified at 76. Toward the impeller end 76, the shaft 64 is encompassed by a bushing 78. Toward the motor end 74, the shaft 60 is encompassed by a gland follower 80. The gland follower 80 includes a flange 81 that inserts into the stuffing box 62 to apply pressure against the packing rings 50. Those skilled in the art will appreciate that the gland follower 80 is torqued down on threaded bolts 84 with nuts 86. In the illustrated embodiment, a liveload assembly 90 sits between the nut 86 and the gland follower 80 to apply force to the gland follower and against the packing rings 50 in the stuffing box 62.

A plurality of the packing rings 50 are placed into the stuffing box 62 of a fluid flow control device, such as the pump 60 illustrated in FIG. 6. When the stuffing box 62 is full, the gland follower 80 is positioned with the flange 82 closing the stuffing box 62. The gland follower 80 is conventionally secured, such as by bolts 84 and nuts 86. In the illustrated embodiment, a liveload assembly 90 is positioned between the nut 86 and the gland follower 80 to apply force to the gland follower and thus against the packing rings 50 in the stuffing box 62.

Securing the gland follower 80 applies pressure to the packing rings 50 in the stuffing box 62. The adhesive 24 remains in the packing rings 50 due to the reduced flowability of the adhesive while the maintained tack retains the skin 20 wrapped around the core 12 during shipping of the packing 10, handling to form the packing ring, and installation of the ring in the stuffing box.

In the alternate embodiment illustrated in FIG. 3, the packing 30 is cut to length to fit a particular stuffing box. The length of the packing 30 is placed in a conventional die and compressed to the desired cross-section and diameter for the particular stuffing box. Thus, the packing material of the present invention can be supplied in its preferred form as a spiral coil for use in repacking stuffing boxes, or can be provided as a preformed die cut-ring for installation in a stuffing box of a fluid flow equipment.

Packing having reduced adhesive flowability with maintained tack which embodies the present invention was tested in valves under stress conditions. These tests compare the performance of the packing. In particular, however, the valve were opened and inspected for adhesive flow between the packing and the shaft. Adhesive flow during the initial installation of the packing can lead to adhesive-freeze or lockup of the shaft of a fluid flow device. Adhesive flow in the test valve would indicate a significant potential for such lockup or decreased useful life for the packing because of increased leakage or increased friction.

In designing tests for comparing packing, it is recognized that the operation of valves, and other fluid flow devices, vary in processing plants. Some valves open more frequently than others. Typically, control valves operate most frequently. In some cases the control valves operate as often as every minute, or less. Other valves may operate only infrequently, for example once per month or year. Also, the speed and travel length of the stem vary. The speed and travel length depend particularly on the manufacturer of the valve, the size of the valve, and the function performed by the valve.

The valves used in the tests were manufactured by Velan with the following specifications:

| | |
|---|---|
| Type-Gate Valve | Size 6 inch |
| Class: 300 WOG | |
| Stem Diameter: 1-1/4 inch | Box Diameter: 1-7/8 inch |
| Stem Finish: 32 RMS | Box Finish: 63 RMS |

An actuator operated the valve. Unless otherwise noted, the stroke length of the valve was 14 inches, the stem moved at the rate of 14 inches per minute, and the valve was pressured to 100 pounds per square inch (psi) with methane gas.

The test apparatus includes the capability to monitor friction on the stem imposed by the packing and the torque on the gland follower. A load cell mounts between the valve stem and the actuator. The load cell measures the force required to open and to close the valve. The force indicates the friction imposed by the packing on the stem. The actuators and the load cells have a 5000 pound capacity. One cycle is defined as one closing and one opening stroke. A digital electronic counter maintains the cycle count for each valve.

The packings included in the tests were installed with a torque of 400 inch-pounds applied to the gland follower. The torque was then backed-off to 225 inch-pounds before pressurizing the valve. The valves were retorqued when the leakage exceeded 500 parts per million. Leakage was determined by the use of an organic chemical sniffer which meets the requirements of Title 40 of the Code of Federal Regulations, Appendix A, Method 21.

The tests used a Bacharach sniffer model 23-7350 to detect emissions of methane gas from the valve. The sniffer is manufactured by Bacharach Instrument Company of Pittsburgh, Pa. and is approved by the United States Environmental Protection Agency for detection of methane. The tests use methane gas because this gas leaks easier than other fluids, except helium and hydrogen gases.

As discussed above, the test valves were monitored for emissions and for the force required to operate the valve. The valves were checked randomly while cycling and leakage measurements recorded. If leakage emissions exceeded 500 parts per million (ppm), the valve was retorqued to the 225 inch-pounds specification or if different, as shown in the tables below. Both opening and closing friction were measured during the tests. Tables 1–3 shown below report leakage and friction measurements made during random cycles. The leakage is reported in parts per million; the friction is reported in pounds. In the tests, the torque was set initially at 225 inch-pounds and retorqued after taking the measurements at the cycles indicated below.

TABLE 1

Packing baked at 400° F. for two hours.
Lubricant coating applied by immersing the packing in a solution of TFE and graphite (1:3 TFE to water by volume) with a subsequent coating of C5A.
Five (5) packing rings
Shaft speed 7 inches/minute

| | | Friction | | | |
|---|---|---|---|---|---|
| Cycle | Leakage | Up | Down | Torque | Retorque |
| 5 | 0 | 90 | 200 | | |
| 196 | 0 | 275 | 375 | | |
| 504 | 10 | 300 | 425 | | |
| 583 | 42 | 290 | 420 | | |
| 679 | 42 | 300 | 425 | | |
| 748 | 42 | 290 | 420 | | |
| 897 | 110 | 290 | 400 | | |
| 949 | 90 | 300 | 400 | | |
| 998 | 100 | 300 | 395 | | |
| 1141 | 70 | 300 | 390 | | |
| 1290 | 50 | 290 | 400 | | |
| 1746 | 90 | 260 | 385 | | |
| 1830 | 90 | 270 | 380 | | |
| 1957 | 125 | 260 | 375 | | |
| 2042 | 160 | 260 | 375 | | |
| 2302 | 180 | 260 | 365 | | |
| 2326 | 190 | 250 | 360 | | |
| 2446 | 220 | 250 | 365 | | |
| 2619 | 300 | 240 | 360 | | |

Examination of the stem after the test showed no adhesive migration from the packing onto the stem. Leakage was low through out the test. Friction was low. No retorques were required during this test.

TABLE 2

Unbaked packing
Four (4) rings and 1 1/4 inch bushing
The rings were coated with TFE and graphite solution (1:5 TFE to water)
Valve pressurized to 300 psi methane

| | | Friction | | | |
|---|---|---|---|---|---|
| Cycle | Leakage | Up | Down | Torque | Retorque |
| 58 | 220 | 200 | 700 | | |
| 145 | 850 | 146 | 700 | | yes |
| 154 | 300 | 275 | 825 | | |

TABLE 2-continued

Unbaked packing
Four (4) rings and 1 1/4 inch bushing
The rings were coated with TFE and graphite solution (1:5 TFE to water)
Valve pressurized to 300 psi methane

| | | Friction | | | |
|---|---|---|---|---|---|
| Cycle | Leakage | Up | Down | Torque | Retorque |
| 214 | 1000 | 140 | 750 | | yes |
| 217 | 180 | 250 | 925 | | |
| 272 | 380 | 230 | 775 | | |
| 321 | 300 | 225 | 800 | | |
| 405 | 550 | 125 | 725 | | yes |
| 416 | 75 | 475 | 1150 | | |
| 548 | 575 | 150 | 800 | | yes |
| 557 | 75 | 450 | 1000 | | |
| 677 | 550 | 175 | 700 | | yes |
| 686 | 180 | 400 | 950 | | |
| 749 | 600 | 225 | 800 | | yes |
| 751 | 380 | 440 | 1000 | | |
| 812 | 800 | 275 | 825 | | yes |
| 815 | 400 | 390 | 950 | | |
| 914 | 850 | 240 | 800 | 300 | yes |
| 924 | 200 | | 950 | 1450 | |
| 940 | 900 | | | 350 | yes |
| 960 | 320 | 900 | 1350 | | |
| 962 | 1000 | | | 400 | yes |
| 963 | 120 | 950 | 1450 | | |
| 964 | 1000 | | | 500 | yes |

Examination of the valve after the test showed adhesive on the stem of the valve. The test data shows excessive leakage and elevated friction.

TABLE 3

Unbaked packing
Five (5) rings coated with TFE and graphite (1:5 TFE to water)
15/16 inch bushing

| | | Friction | | | |
|---|---|---|---|---|---|
| Cycle | Leakage | Up | Down | Torque | Retorque |
| 38 | 140 | 300 | 950 | | |
| 138 | 580 | 260 | 900 | | yes |
| 140 | 440 | 260 | 900 | | |
| 152 | 380 | 250 | 850 | | |
| 193 | 550 | 200 | 950 | 250 | yes |
| 197 | 300 | 250 | 950 | | |
| 253 | 1000 | 250 | 825 | | |
| 267 | 1000 | | | 300 | yes |
| 268 | 200 | 600 | 1175 | | |
| 374 | 1500 | 150 | 825 | 350 | yes |
| 384 | 300 | 275 | 925 | | |
| 484 | 600 | 250 | 800 | 350 | yes |
| 492 | 280 | 475 | 1050 | | |
| 545 | 880 | 420 | 800 | 350 | yes |
| 546 | 550 | | | 400 | yes |
| 547 | 220 | 600 | 1100 | | |
| 589 | 600 | 250 | 850 | | yes |
| 592 | 380 | 550 | 1000 | | |
| 688 | 1500 | 250 | 850 | | yes |
| 691 | 120 | 900 | 1250 | | |

The test was stopped because of excessive continued leakage and noisy operation. Examination of the valve showed adhesive on the stem of the valve. The test results show excessive leakage and elevated friction. Frequent retorques were necessary.

The present invention provides a packing with reduced flowability of the adhesive that holds the skin wrapped around the flexible core while maintaining tack. The reduced flowability restricts the adhesive from migrating under installation pressure from the packing and onto the stem or shaft of the fluid flow device, leading to improved leak prevention performance and increased useful life for the packing.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described by the following claims.

What is claimed is:

1. A packing material for sealing a rotary or reciprocating shaft in a stuffing box of a fluid flow device, comprising:

an assembled elongated jacketed packing, comprising:
   a flexible core made of a plurality of braided fibers;
   an intermediate layer of an adhesive; and
   a skin of expanded intercalated graphite enveloped about the core; and the assembled packing heat cured at a temperature of between about 350° F. and 450° F. for a period of between about one and three hours in order to reduce the flowability of the adhesive while maintaining tack sufficient to secure the skin to the flexible core.

2. The packing material as recited in claim 1, wherein the heat cure temperature is about 400° F. and the heat cure period is about two hours.

3. The packing material as recited in claim 1, wherein the flexible core is wire mesh.

4. The packing material as recited in claim 1, wherein the flexible core is braided yarn.

5. The packing material as recited in claim 1, wherein the flexible core further comprises a lubricant and a binder.

6. The packing material as recited in claim 1, wherein the adhesive is mylar.

7. The packing material as recited in claim 1, wherein the skin is a tape of intercalated graphite helically wrapped with the edges arranged in overlapping relationship.

8. The packing material as recited in claim 1, wherein the skin comprises a sheet of expanded intercalated graphite wrapped longitudinally around the flexible core.

* * * * *